(12) United States Patent
Ishii et al.

(10) Patent No.: US 6,875,716 B2
(45) Date of Patent: Apr. 5, 2005

(54) CARBONACEOUS REFRACTORY AND METHOD FOR PREPARING THE SAME (75) Inventors: Akio Ishii, Kisarazu (JP); Hitoshi Nakamura, Kimitsu (JP); Michio Nitta, Chiba (JP); Tsutomu Wakasa, Fuji (JP); Hirofumi Mikami, Shizuoka (JP); Yoshiyuki Yamagami, Shizuoka (JP)

(73) Assignees: Nippon Steel Corporation, Tokyo (JP); Nippon Electrode Company, Ltd., Shizuoka (JP)

( * ) Notice: Subject to any disclaimer, the term of this patent is extended or adjusted under 35 U.S.C. 154(b) by 0 days.

(21) Appl. No.: 09/980,366
(22) PCT Filed: Mar. 30, 2001
(86) PCT No.: PCT/JP01/02704
§ 371 (c)(1), (2), (4) Date: Nov. 28, 2001
(87) PCT Pub. No.: WO01/74738
PCT Pub. Date: Oct. 11, 2001

(65) Prior Publication Data
US 2002/0183189 A1 Dec. 5, 2002

(30) Foreign Application Priority Data
Mar. 30, 2000 (JP) ......................................... 2000-95133

(51) Int. Cl.$^7$ .............................................. C04B 35/52
(52) U.S. Cl. .......................................... 501/100; 75/241
(58) Field of Search ........................... 501/100; 75/241, 75/255

(56) References Cited

U.S. PATENT DOCUMENTS 4,306,030 A * 12/1981 Watanabe et al. ............. 501/99

* cited by examiner

Primary Examiner—Paul Marcantoni (57) ABSTRACT

A carbonaceous refractory material is produced by adding an organic binder to a mixture containing a carbonaceous material comprising a carbonaceous raw material comprising calcined anthracite, calcined coke, artificial graphite or natural graphite or a mixture thereof at 50 to 85% as the principal raw material, alumina particle at 5 to 15%, metal silicon particle at 5 to 15%, and one or two or more of titanium carbide powder, titanium nitride powder and titanium carbonitride powder at 5 to 20% in total, kneading and molding the resulting mixture and baking the molded article under non-oxidizing atmosphere. By using the carbonaceous refractory material as the inner lining material for the side wall and bottom of blast furnace hearth, the consumption of the inner lining material due to the dissolution thereof in melted pig iron can be decreased, and simultaneously, the abrasion due to the flow of melted pig iron can be decreased, which works to prolong the life of the blast furnace.

12 Claims, 4 Drawing Sheets

CARBONACEOUS REFRACTORY AND METHOD FOR PREPARING THE SAME

TECHNICAL FIELD

The present invention concerns a refractory material for application in non-oxidizing atmosphere. More specifically, the invention relates to a carbonaceous refractory material suitable as the lining material for the side walls and bottom region of blast furnace hearth, and a method of producing such a refractory material.

BACKGROUND OF THE INVENTION

Recent furnaces under non-oxidizing atmosphere operation, including blast furnaces, have been scaled up and operated under severer conditions. Damaging factors toward the lining refractory materials have increased because of the trend of high-pressure operation, Pulverized Coal Injection operation and so on. Against those circumstances, it is required to suppress initial its investment and attain longer life. The life of blast furnace depends on the durability of the lining material of the side walls and bottom region of blast furnace hearth. Carbonaceous refractory materials are popularly used as the lining material for the portions of the sidewall and bottom region of blast furnace hearth. In other words, the improvement of the durability of carbonaceous refractory materials for lining material has decisive effect on the blast furnace life.

Generally, carbonaceous refractory materials are produced by adding organic binders, such as coal tar pitch, phenol resin, etc. to a carbon aggregate, such as calcined anthracite, artificial graphite and natural graphite. Then, the mixture is kneaded, formed by extrusion or compression molding, and thereafter baked in coke breeze packings. Compared with fire clay brick, carbonaceous refractory materials have a weak point because of the dissolution in molten iron. However, Carbonaceous refractory materials have been predominantly used as the lining material of blast furnace hearth. It is because carbonaceous refractory materials have high thermal conductivity and excellent slug resistance.

Currently it is well known that the causes of the damage of carbonaceous refractory materials in blast furnace are carburization dissolution into molten iron, structural destruction due to the penetration of molten iron into the pore, formation of cracks due to the penetration and reaction with alkali and zinc vapors, formation of cracks due to thermal stress and abrasion due to the flow of molten iron.

For the purpose of the improvement of the durability of carbonaceous refractory materials, therefore, many proposals have been made about the composition of carbonaceous refractory materials, manufacturing method, application method, etc., and they are actually applied the actual operation. For example, the present inventor has disclosed in Japanese Patent Publication No. Sho-56-18559 a carbonaceous refractory material for blast furnace, in which metal oxides, such as α-alumina, zircon and magnesia, are mixed into the main raw materials of the carbon aggregate to reduce the carburization dissolution rate into molten iron.

Also, the present inventor has disclosed in Japanese Patent Publication No. Sho 58-43350 a method for producing a carbonaceous refractory material for blast furnace, in which metallic silicon particles are mixed into the main raw materials of carbon aggregate to generate a whisker-like silicon compounds in the pore of the carbonaceous refractory material during the baking process, so that pores with a diameter of 1 μm or more, into which molten iron can infiltrate, to be reduced. As the results, the penetration of molten iron and infiltration of reactive gas into the carbonaceous refractory material are reduced.

Japanese Patent Laid-open No. Hei-7-172907 has disclosed a carbon-containing refractory material with improved oxidation resistance and corrosion resistance, which is produced by adding titanium carbide powder to a mixture of a carbonaceous material and an alumina. This carbon-containing refractory material forms an $Al_2O_3/TiO_2$-system compounds after oxidizing reaction at high temperature, and its structure becomes dense.

Japanese Patent No. 2747734 has disclosed a carbon-containing refractory material with high corrosion resistance and oxidation resistance, which contains a carbide material, for example titanium carbide, as an antioxidant in addition to a carbon and a refractory oxide materials.

Furthermore, the inventor has disclosed in Japanese Patent Laid-open No. Hei-8-81706 a method for producing a large carbonaceous refractory material for blast furnace, which has high thermal conductivity, a little carburization dissolution property and a small pore diameter. In this Laid-open Japanese patent, artificial graphite and natural graphite, which have high thermal conductivity, are selected as main raw materials of the carbonaceous refractory materials to increase thermal conductivity of the product.

With such various countermeasures described above, the durability of carbonaceous refractory materials has been improved. However, the reduction of a carburization dissolution rate of a carbonaceous refractory material retaining high thermal conductivity and slug resistance is still limited as long as main raw material is carbon aggregate.

As described in the Japanese Patent Publication No. Sho-56-18559, the addition of metal oxides such as α-alumina is clearly effective only for reducing of the carburization dissolution rate. Namely, it is possible to reduce the carburization dissolution rate extremely by adding a large amount of metal oxides. However, the slug resistance and thermal conductivity decreases under a higher content of metal oxides.

Further, the refractory material described in Japanese Patent Laid-open No. Hei-7-172907 is insufficient in view of wettability with molten iron after oxidization at high temperature, because the refractory material does no contain metallic titanium, titanium carbide or titanium nitride. Hence, such refractory material does not have excellent corrosion resistance property. Still further, the refractory material described in Japanese Patent No. 2747734 contains 30% or less carbon. Moreover the patent does not includes any description that titanium carbide can improve the wettability with molten iron. Thus, the refractory material in this invention is based on a different technical concept from the present invention.

Additionally, one specific problem of refractory materials at the bottom of blast furnace hearth is abrasion of the inner-lined carbonaceous refractory material due to the flow of melted pig iron. In other words, iron discharge operation generates a circular flow of melted pig iron at the bottom of blast furnace. It is known that carbonaceous refractory materials in regions along the circular flow are abraded seriously, compared with other regions. Because carbonaceous refractory materials which consist of carbon aggregates as its main raw materials in particular are not wettable with melted pig iron and so they can hardly generate a protective layer on the surfaces. Therefore, a fresh surface is continuously left in contact with melted pig iron. Then, the carbonaceous refractory materials are gradually abraded by the flow of melted pig iron.

The following propositions have been made to prevent such abrasion of inner-lined carbonaceous refractory materials because of the circular flow. Japanese Patent Laid-open No. Hei-10-298623 proposes a blast furnace bottom structure and a method of operating a blast furnace, in which the blast furnace has tap holes at different level of altitude, upper and lower tap holes. Monitoring the temperature distribution in the lining material of the bottom, tap operation in upper and lower tap holes are controlled to float DEAD-MAN formed on the blast furnace bottom, and then such circular flow could be eliminated by allowing melted pig iron to move on the overall furnace bottom.

Other Japanese Patent Laid-open No. Hei-9-41009 proposes a method for preventing direct contact between carbonaceous refractory material and melted pig iron by charging a $TiO_2$ source into a blast furnace and efficiently precipitating a Ti compound-containing protective layer with a high melting point on the bottom. However, the protective layer with a high melting point can not be fixed on the bottom of blast furnace because the protective layer with a high melting point and the carbonaceous refractory material cannot react each other or are never wetted with or bound to each other. Thus, the method can not prevent the protective layer to be washed away.

As described above, the durability of a carbonaceous refractory material can be improved by reducing the carburization dissolution rate and by allowing the refractory material to be wettable with melted pig iron. According to the conventional methods, however, the carburization dissolution rate cannot be reduced while the thermal conductivity and slug resistance are retained. Further, any carbonaceous refractory material wettable with melted pig iron has not been disclosed yet.

The present invention has been proposed to overcome the problems of the related art described above. The objective of the invention is to provide a carbonaceous refractory material with a reduced carburization dissolution rate together with attaining wettability with molten iron, particularly melted pig iron, while the carbonaceous refractory material retains thermal conductivity and slug resistance, and a method for producing the carbonaceous refractory material.

DISCLOSURE OF THE INVENTION

The inventors have investigated to attain the objective by adding various compounds to conventional carbonaceous refractory materials to reduce the carburization dissolution rate through giving wettability to the carbonaceous refractory materials with melted pig iron. Thus, the invention has been achieved and the summary of the invention is described as follows.

1. A carbonaceous refractory material consists of 50 to 80% ("%" means "% by mass") of carbon, 5 to 15% of alumina, 5 to 15% of metallic silicon, and 5 to 20% in total of one or two or more material(s) out of metallic titanium, titanium carbide, titanium nitride and titanium carbonitride ($TiC_xN_y$ where 0<x, y<1 and x+y=1).
2. A method for producing a carbonaceous refractory material by compounding 50–85% of carbonaceous materials, as main raw materials, which are calcined anthracite, calcined coke, natural graphite, artificial graphite or these mixture, with 5–15% of alumina powder, 5–15% of metallic silicon powder and 5–20% in total of one or two or more material(s) out of metallic titanium, titanium carbide, titanium nitride, and titanium carbonitride ($TiC_xN_y$ where 0<x, y<1 and x+y=1), and by adding organic binder to the mixture, then kneading, forming and baking in non-oxidation atmosphere to obtain the carbonaceous refractory materials in the first claim of the invention.
3. The carbonaceous refractory material in the first or second claim, where the X-ray diffraction peak intensity ratio of the face (200) of the $Ti_3O_5$ to the face (111) of titanium carbide is 1% or less.
4. The carbonaceous refractory material in the first claim, where a part or the whole of the alumina is replaced by one or two or more material(s) out of zircon, magnesia, mullite, spinel and silica.
5. The method for producing the carbonaceous refractory material in the second claim, where a part or the whole of the alumina powder is replaced by one or two or more material(s) out of the powder of zircon, magnesia, mullite, spinel and silica.

The content of the alumina or alumina powder is preferably 5 to 15% ("%" means "% by mass" hereinafter) because when it is below 5%, the resistance against the molten iron is poor, while above 15%, the slug resistance and thermal conductivity are reduced. The same effect can be obtained when particles of refractory metal oxides such as zircon, magnesia, mullite, spinel and silica are contained, instead of alumina, as described in the previously applied Japanese Patent Laid-open No. Sho-56-18559. The particle size of alumina powder as the raw material is preferably 74 $\mu$m or less, because local corrosion of melted iron progresses when the particle is coarse. On the other hands, the particle size of alumina powder is preferably 1 $\mu$m or more to secure the outlet path of gases generated during baking, The content of metallic silicon or metal silicon powder is preferably 5 to 15% ("%" means "% by mass"), because the partitioning effect in the pore by metallic silicon is insufficient below 5% and unfavorable unrecalled metallic silicon remains when metallic silicon content exceeds 15%. The particle size of metallic silicon powder as the raw material is preferably 74 $\mu$m or less to prevent the residue of unreacted metallic silicon. Particle size of the metallic silicon particle is preferably 1 $\mu$m or more to secure the outlet path of gasses generated during baking process.

Coal tar pitch and phenol resin can be used as the organic binder.

The effect containing alumina and metallic silicon, or alumina powder and metallic silicon powder is already known. The distinctive of this invention is adding titanium carbide or other titanium compounds or titanium carbide powder or other titanium compounds powder at 5 to 20% to the refractory material together with alimina, metallic silicon or their powders. Herein, the content of metallic titanium or titanium compounds above mentioned is preferably 5 to 20% ("%" means "% by mass" hereinafter), because the effect on resistance against the molten iron is insufficient below 5% and the effect on resistance against the molten iron remains the same above 20%. When it exceed 20%, they suffer difficulties in mechanical processing and it induces high cost. The inventors have investigated about influence of the particle size of titanium carbide powder. It has been found that a smaller particle size is recommended and that the particle size is preferably below 10 $\mu$m even though the effect of the invention can be materialized when a particle size is less than 35 $\mu$m. When the particle size is about 2 $\mu$m, satisfactory effect was obtained even when the content of titanium carbide particle is about 5%.

The same effect was obtained when metallic titanium powder, titanium nitride powder or titanium carbonitride ($TiC_xN_y$, where $0 < x, y < 1$ and $x+y=1$) powder was contained, in place of titanium carbide powder. It was found that the same effect was obtained when a mixture of two or three or more of these metallic titanium and these titanium compounds at any ratio is contained at 5 to 20%.

Figure 1:
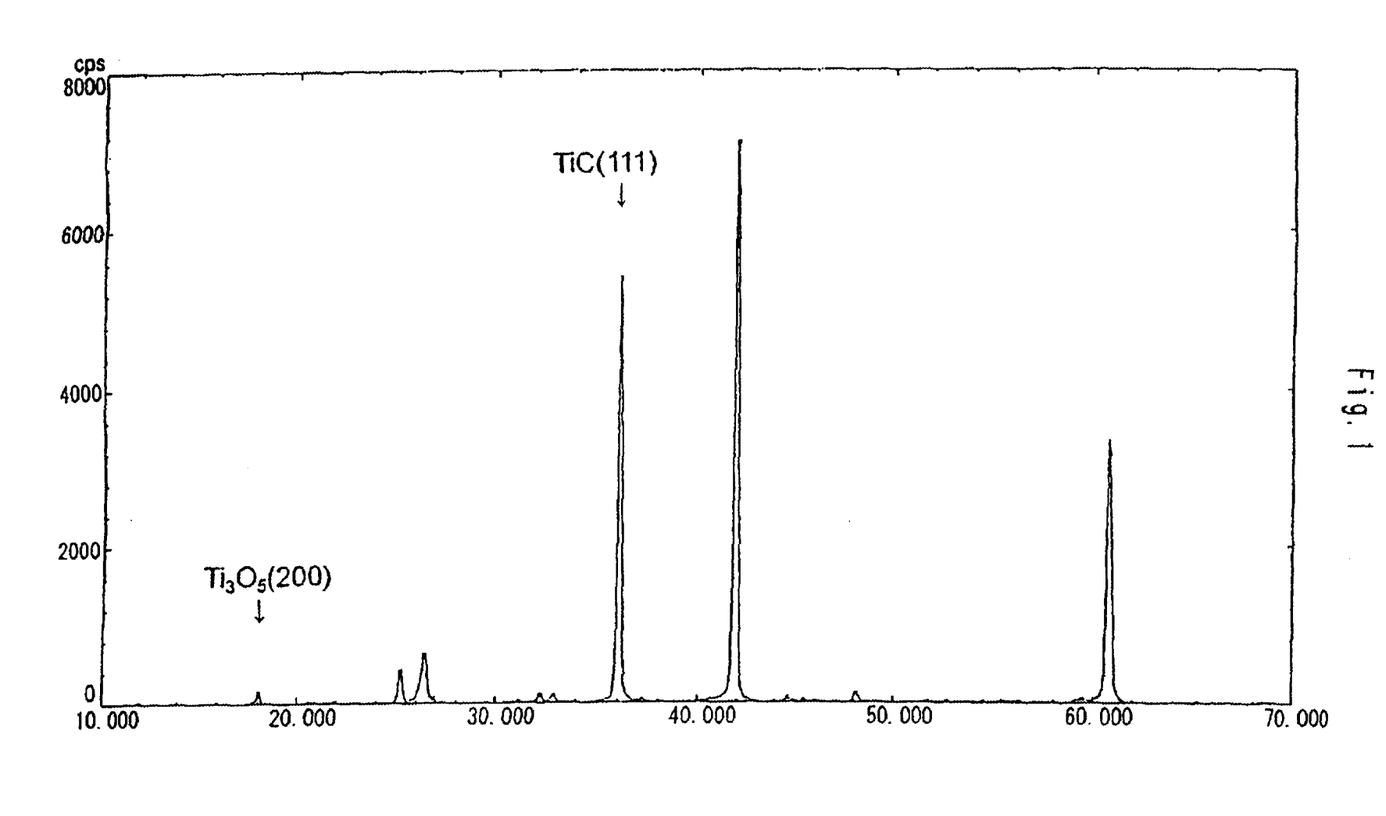
FIG. 1 is a chart of the analysis results of a conventional reagent TiC, using X-ray diffraction apparatus.
Figure 2:
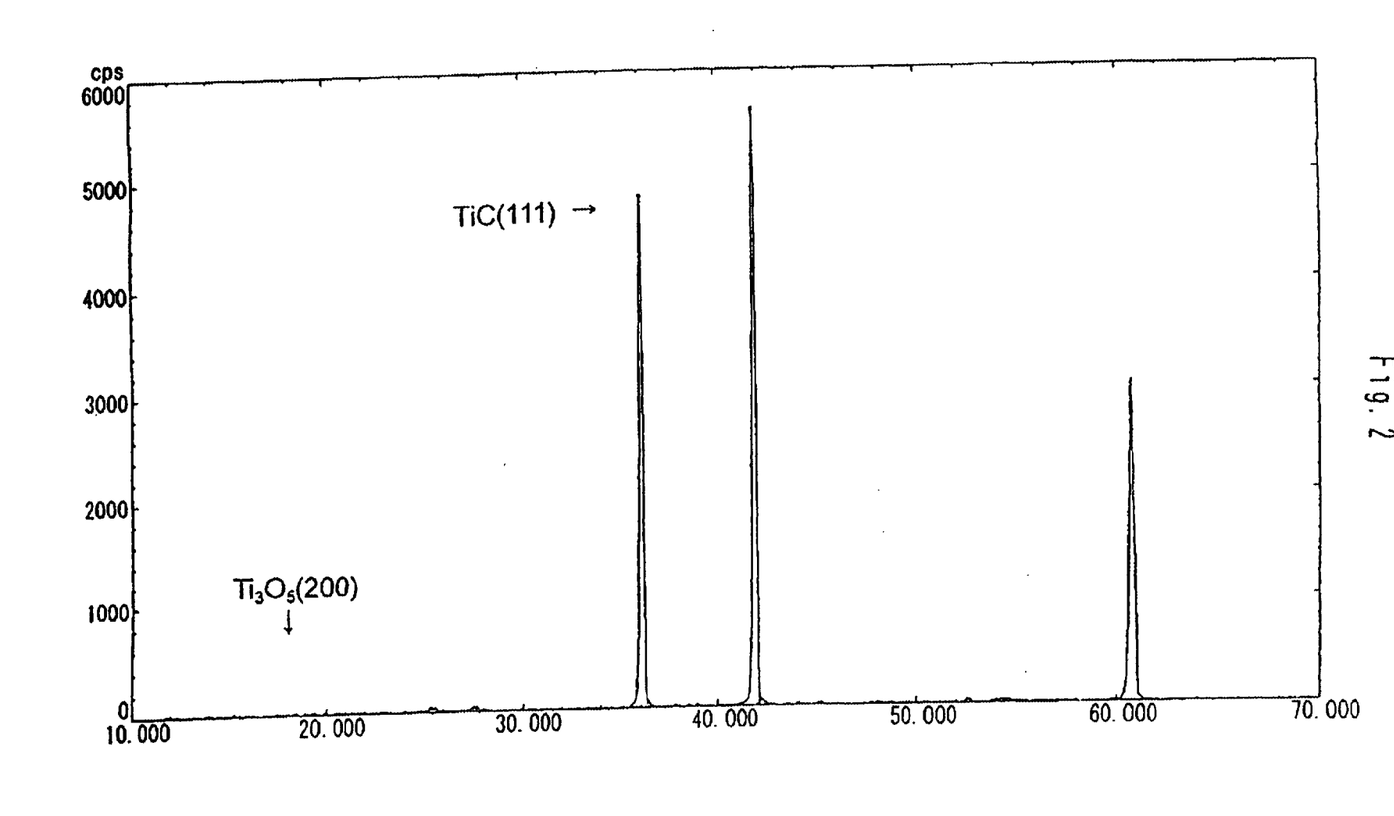
FIG. 2 is a chart of the analysis results of the inventive reagent TiC, using X-ray diffraction apparatus.

It was found nevertheless that addition of carbides, nitrides or carbonitride of metals conventionally selected from the conventionally used Ti group to known refractory materials in Japanese Patent Laid-open No. Sho-52-141403 for the purpose of forming a protective film of TITANIUM BEAR in the overall inner face of the furnace bottom, and the titanium compound used in Japanese Patent Laid-open No. Sho-53-7709, where titanium bare is formed in the proximity of the surface of a refractory material by adding one or two or more of metals such as Ti and Zr, or alloys, oxides, nitrides or carbides thereof to the raw materials of a carbonaceous refractory material to reduce the corrosion rate of the refractory material, have distinctively deteriorated corrosion resistance against melted pig iron with a low Ti content, or caused significant abrasion due to the flow of melted pig iron. The reason may possibly be as follows. As shown in the analytical results of conventional TiC reagents in FIG. 1, using an X-ray diffraction apparatus RAD-rR (Cu-k$\alpha$ 50 kV/100 mA) manufactured by Rigaku Corporation, an impurity is present in the conventional TiC reagent at 2.7% on the X-ray diffraction peak intensity ratio of the face (220) of $Ti_3O_5$ compared to the intensity of the face (111) of TiC. Thus, the oxygen of $Ti_3O_5$ reacts with the carbon in the refractory material to form micropores, so that the titanium bare which is supposed to work as a protective layer described in Japanese Patent Laid-open No. Sho-52-141403 is not continuously formed on the entire inner face of the furnace bottom. Hence, a protective layer with a high melting point, which should closely cover the entire surface of the refractory material of the invention, cannot be satisfactorily formed by generating the micropores in the refractory material, although the titanium bare is formed in the proximity of the refractory material surface as described in the Japanese Patent Laid-open No. Sho-53-7709. As shown in FIG. 2, therefore, it is indicated that the effect of the invention cannot be obtained unless $Ti_3O_5$ content in the titanium carbide is below 1% with the X-ray diffraction peak intensity ratio.

Carbonaceous refractory materials are consumed when it contacts with molten iron directly, particularly melted pig iron, because the carbon aggregates therein dissolves due to carburizing reaction of iron. When alumina and other metallic oxides previously mentioned are contained in carbonaceous refractory materials, they remain on the surface of the carbonaceous refractory materials even after the dissolution of the carbon aggregates and stay between the carbonaceous refractory materials and molten iron for functioning to prevent the contact between the carbonaceous refractory materials and melted pig iron, and they reduce the consumption speed of the carbonaceous refractory materials.

However, when a large amount of alumina is contained in carbonaceous refractory materials, the residual alumina layer after the dissolution of the carbon aggregates covers the entire surface of the carbonaceous refractory materials, which makes the dissolution rate at the interface between melted iron and slug interface accelerate. The alumina content is required to be within an adequate range to balance the dissolution speed into molten iron and the slug resistance.

Meanwhile, additives in this invention to the baked refractory material, namely metallic titanium, titanium carbide, titanium nitride and the intermediate compounds, titanium carbonitride, do not dissolve into molten iron, particularly melted pig iron, slug and the interface between molten iron and slug, if they are used under non-oxidizing atmosphere. Therefore, the resistance performance against molten iron and slug of a carbonaceous refractory material can be improved when these compounds are contained in the carbonaceous refractory material. Since these metallic titanium and titanium compounds are expensive raw materials, it is not economical to add enough amount to cover the whole surface of the carbonaceous refractory material with the layer of the residual titanium compounds after the dissolution of the carbonaceous aggregate.

To avoid the problem above mentioned, alumina as an inexpensive raw material is contained within a range not to deteriorate the slug resistance of the carbonaceous refractory material, and metallic titanium or titanium compounds are contained therein at such a supplementary amount enough to sufficiently cover the whole surface of the carbonaceous refractory material, which cannot be sufficiently supplied by the residual alumina layer after the dissolution of the carbon aggregate. In such manner, the whole surface of the carbonaceous refractory material can be covered with the residual alumina layer or the layer of the residual titanium compounds. The consumption of the carbonaceous refractory material by the dissolution with melted pig iron is thereby terminated, without suffering of the deterioration of the slug resistance.

Figure 3A:
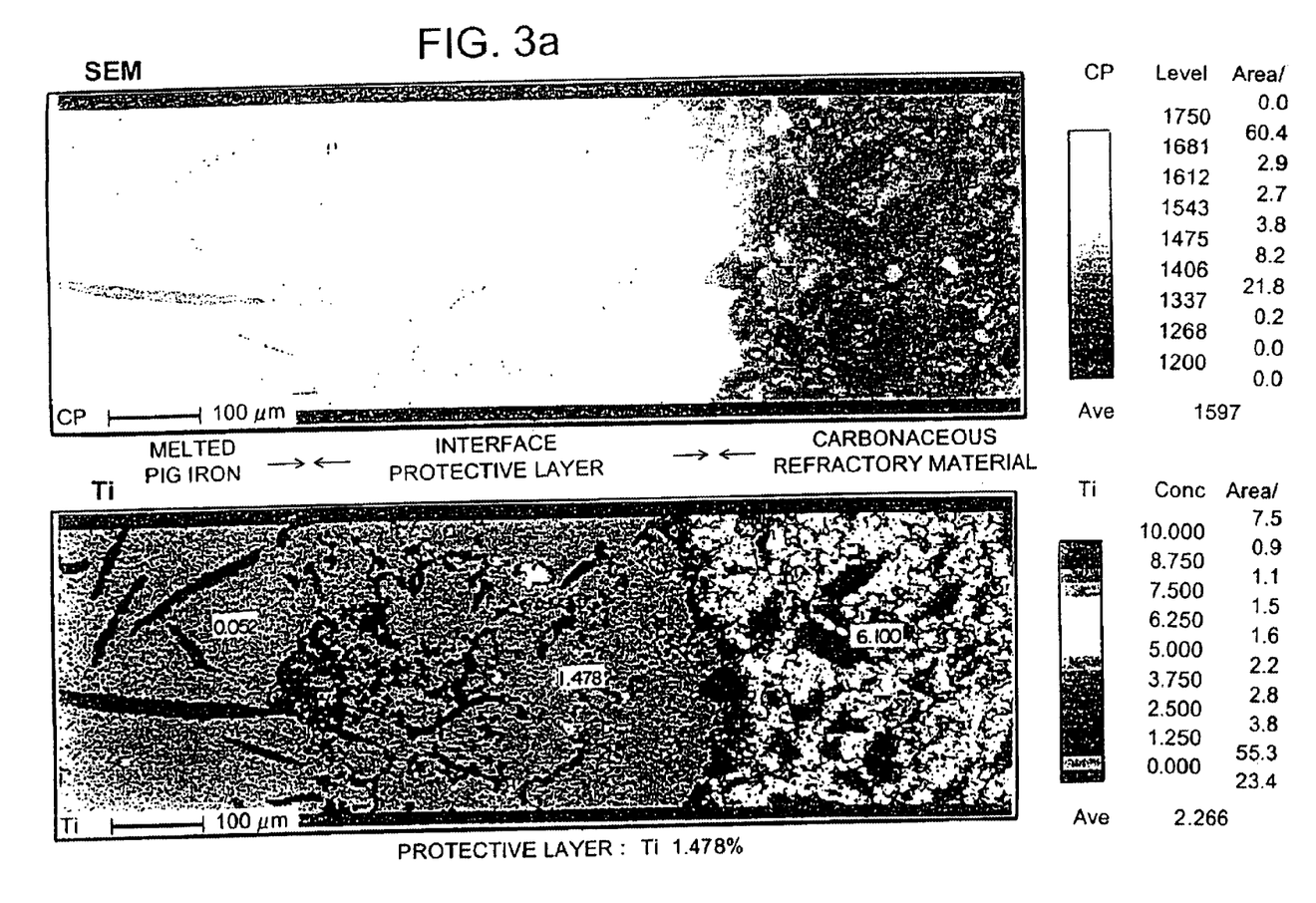
FIGS. 3a and 3b are photo-pictures depicting the observation results of the cross sectional of the interface protective layer in accordance with the invention, using CMA analysis apparatus.
Figure 3B:
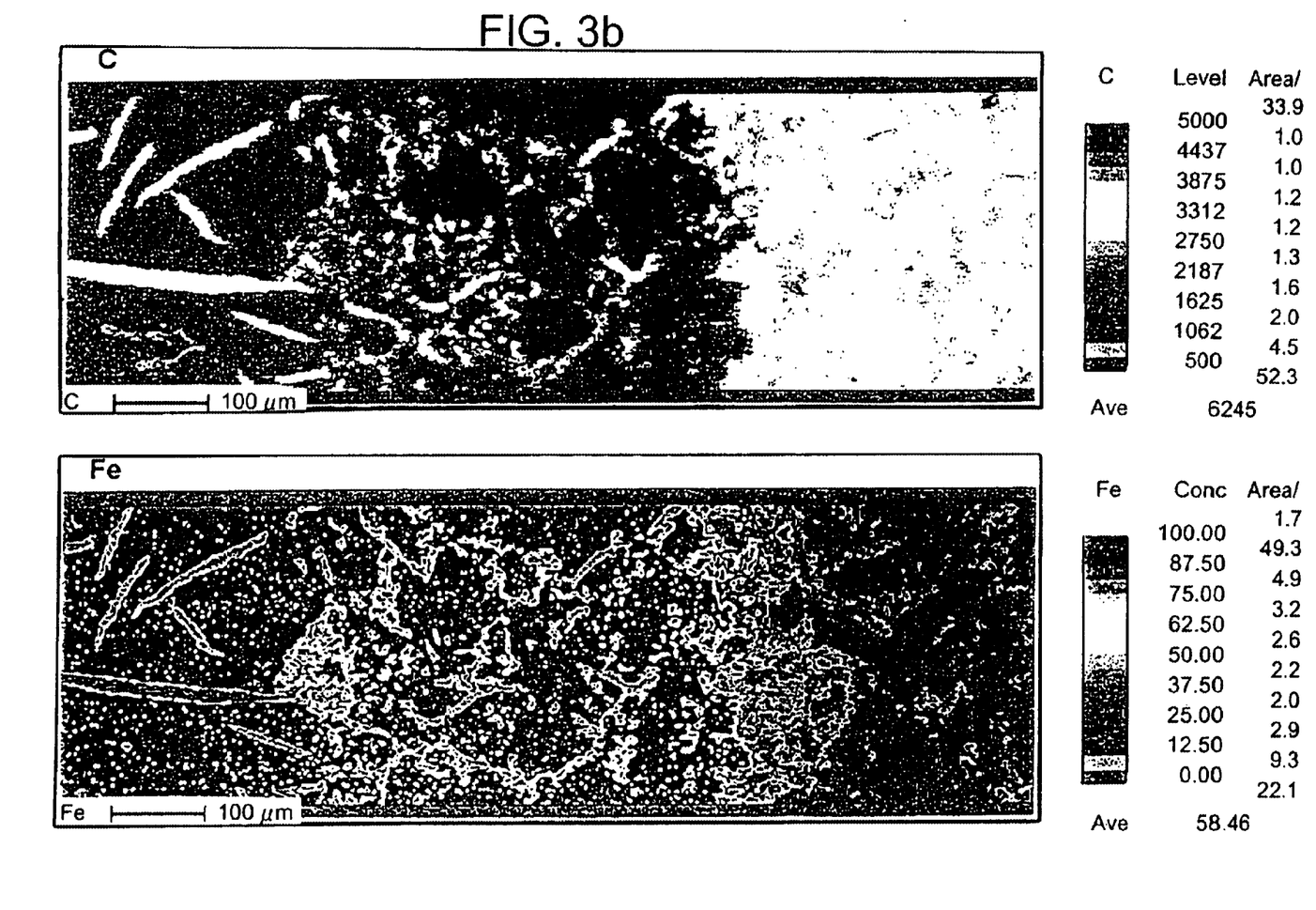

The reagent titanium carbide for general use cannot form a high melting protective layer which stick to the whole surface of a refractory material, because a small amounts of oxides contained in the reagent of titanium carbide as described before react with carbon in the refractory material and formation reaction of micropores on the surface layer of the refractory material is predominant. Therefore, the X-ray diffraction peak intensity the face (200) of $Ti_3O_5$ should be below 1% relative to that of the face (111) of titanium carbide. Furthermore, the intensity is preferably below 0.5%. The lower limit of the peak intensity ratio of $Ti_3O_5$ is not specifically limited in this invention. A smaller intensity ratio is more preferable. Most preferable state is with no peak intensity observed ($Ti_3O_5$ peak intensity ratio =0). It is observed that a protective layer with a high melting point, in which a small amount of Ti dissolve therein, stick to the whole surface of the carbonaceous materials of the invention. The cross sectional of the interface protective layer in this invention was observed with CMA analysis apparatus (JXA-8900 manufactured by JEOL Ltd.). The results are shown in FIG. 3. A protective layer with a high melting point was recognized, which is formed at the interface between melted pig iron and the surface of the carbonaceous refractory material.

Furthermore, the titanium compounds have a property of wettability with iron to generate a Fe-Ti solid solution and has a property of excellent wettability with melted pig iron containing titanium, in particular. Therefore, by allowing a carbonaceous refractory material to contain carbides, nitrides or carbonitride of titanium compounds, the high melting protective layer on blast furnace bottom is easily bound to the carbonaceous refractory material. Consequently, the high melting protective layer can be fixed on the furnace bottom by using the carbonaceous refractory material containing the titanium compounds, particularly as the inner lining material of the blast furnace bottom. In such manner, direct contact between the moving melted pig iron and the carbonaceous refractory material can scurely be avoided, to prevent the abrasion of the carbonaceous refractory material due to the flow of melted pig iron.

Essentially, the carbon or carbonaceous raw material should be contained at 50% or more, to maintain enough thermal conduction. Above 85%, the pore diameter is larger and the melted pig iron resistance is deteriorated. Therefore, the content should be defined below 85%.

The refractory material described in the first or fourth claims of the invention can be produced by baking the refractory raw material described in the second or fifth claims of the invention under non-oxidizing atmosphere. As the non-oxidizing atmosphere, inactive atmosphere in coke breeze, vacuum container or $N_2$ or Ar is used.

The carbonaceous refractory material of the invention is described hereby mainly for application to blast furnace bottom. The carbonaceous refractory material can be used with no specific limitation of the application, and may be used in the other area under non-oxidizing atmosphere, such as electric furnace for iron alloy and cupola. The carbonaceous refractory material can bring about excellent corrosion resistance and abrasion resistance, because of its great wettability with melted iron.

EMBODIMENT OF THE INVENTION

The following is an explanation of several embodiments of the method in according with the present invention.

Embodiment 1. Effect of Containing Titanium Carbide

Following the compositions shown in Table 1 and with the procedures described below, carbonaceous refractory materials of Sample 1—1 which contains titanium carbide and Samples 1–2 to 1–5 which do not contain titanium carbide were produced. The applied titanium carbide showed the X-ray diffraction peak intensity ratio as indicated in FIG. 2. The samples were baked in coke breeze. Then, the carbonaceous refractory materials of Sample 1–1 to 1–5 were immersed and rotated in the melt, which was composed of melted pig iron and slug, which floated above the pig iron, from a blast furnace, at 1550° C. for one hour. Thereafter, the samples were recovered, to examine the corrosion ratio at the melted pig iron-immersed portion and at the interface between melted pig iron and slug. Thermal conductivity of the samples was also measured.

Herein, the mold size for forming the carbonaceous refractory materials is of 600×600×2,500 mm, while the sample size for melted pig iron test is of 30Φ×120 mm. Testing apparatus for measuring corrosion resistance is equipped with a high-frequency heating furnace in a vessel under reduced pressure. The sample diameters prior to and after the corrosion test were measured. The corrosion ratio was evaluated with the following formula.

Corrosion ratio (%)=[(diameter prior to test)$^2$−(diameter after test)$^2$]/(diameter prior to test)$^2$×100

Further, the thermal conductivity was determined by steady-state heat-flow method (absolute measurement). The results are as shown in Table 1.

Sample 1—1

11 parts of an alumina powder with a particle diameter of 2 to 3 μm and 6 parts of a metallic silicon powder with a particle diameter of 2 to 3 μm were added to a carbon raw material consist of 37 parts of calcined anthracite and 34 parts of artificial graphite. Then, 12 parts of a titanium carbide powder with a particle diameter of 7 μm was added to prepare a raw material of 100 parts in total. The binder which composed of phenol resin and coal tar pitch was added to the raw material, so that the binder content in the resulting roll mixture ends in 16% of total weight. Then, the resulting mixture was kneaded and formed by compression molding at a pressure of 20 MPa. Then, the molded sample was embedded in coke breeze and baked in non-oxidizing atmosphere at 1250° C., to obtain a carbonaceous refractory material.

Sample 1–2

8 parts of an alumina powder with a particle diameter of 2 to 3 μm and 6 parts of a metal silicon particle of a particle diameter below 74 μm were added to a carbon raw material comprising 47 parts of calcined anthracite and 39 parts of artificial graphite, as shown in Table 1, to prepare a raw material of 100 parts in total. The binder which composed of phenol resin and coal tar pitch was added to the raw material, so that the binder content in the resulting mixture ends in 16% of total weight, which is the same procedures as in Sample 1—1. Then, the resulting mixture was kneaded and formed by compression molding at a pressure of 20 MPa. Then, the molded sample was embedded in coke breeze and baked in non-oxidizing atmosphere at 1250° C., to obtain a carbonaceous refractory material.

Sample 1–3

12 parts of an alumina particle of a particle diameter of 2 to 3 μm were added to a carbon materials consist of 45 parts of calcined anthracite, 37 parts of artificial graphite. Quantities of other compositions and preparation procedures were the same as in Sample 1–2, to obtain a carbonaceous refractory material.

Sample 1–4

As indicated in Table 1, Sample 1–4 was obtained as follows. 19 parts of an alumina powder with a particle diameter of 2 to 3 μm were added to a carbon materials consist of 40 parts of calcined anthracite, 35 parts of artificial graphite. Quantities of other compositions and preparation procedures were the same as in Sample 1–2, to obtain a carbonaceous refractory material.

Sample 1–5

28 parts of an alumina powder with a particle diameter of 2 to 3 μm were added to a carbon materials consist of 35 parts of calcined anthracite, 31 parts of artificial graphite. Quantities of other compositions and preparation procedures were the same as in Sample 1–2, to obtain a carbonaceous refractory material.

TABLE 1

|  |  | Sample 1-1 | Sample 1-2 | Sample 1-3 | Sample 1-4 | Sample 1-5 |
|---|---|---|---|---|---|---|
| Raw material | calcined anthracite | 37 | 47 | 45 | 40 | 35 |
|  | artificial graphite | 34 | 39 | 37 | 35 | 31 |

TABLE 1-continued

|  |  | Sample 1-1 | Sample 1-2 | Sample 1-3 | Sample 1-4 | Sample 1-5 |
|---|---|---|---|---|---|---|
|  | $Al_2O_3$ | 11 | 8 | 12 | 19 | 28 |
|  | Si | 6 | 6 | 6 | 6 | 6 |
|  | TiC | 12 | — | — | — | — |
|  | (subtotal of raw materials) | (100) | (100) | (100) | (100) | (100) |
|  | organic binder | 16 | 16 | 16 | 16 | 16 |
| Baked product (%) | C | 72.3 | 85.3 | 81.8 | 75.7 | 67.9 |
|  | $Al_2O_3$ | 9.9 | 7.2 | 10.8 | 17.1 | 25.1 |
|  | Si | 5.4 | 5.4 | 5.4 | 5.4 | 5.4 |
|  | TiC | 10.8 | 2.1 | 2.0 | 1.8 | 1.6 |
|  | others | 1.6 | — | — | — | — |
| Corrosion ratio (%) | melted pig iron-immersed portion | 7.2 | 31.1 | 15.0 | 6.9 | 3.7 |
|  | interface between melted pig iron and slug | 11.6 | 20.1 | 23.3 | 43.3 | 55.5 |
| Thermal conductivity (W/mK) at 600° C. |  | 20.3 | 20.9 | 19.1 | 16.0 | 15.0 |

Others: ashes in calcined anthracite

As clearly indicated in Table 1, the corrosion ratio at the portion immersed in the melted pig iron in Sample 1–3, which contains 4 parts more alumina than Sample 1–2 of 8 parts of alumina, was half of Sample 1–2. Sample 1–3 showed slight increase of the corrosion ratio of the interface between melted pig iron and slug compared to Sample 1–2.

The corrosion ratio at the portion immersed in the melted pig iron in Sample 1–4, which contains 7 parts more alumina than Sample 1–3 of 12 parts of alumina, was half of Sample 1–3. But, the corrosion ratio at the interface between melted pig iron and slug of Sample 1–4 increased about two times that of Sample 1–3.

Further, Sample 1–5 contains the largest alumina content among the Samples. The corrosion ratio of the melted pig iron-immersed portion was the smallest, namely 3.7%, while the corrosion ratio at the interface between melted pig iron and slug was contrary the largest, namely 55.5%.

In Sample 1—1, the alumina content is only 11 parts, while Tic is added to avoid the increase of alumina content. The corrosion ratio of the melted pig iron-immersed portion in Sample 1—1 is 7.2%, which is almost equal to the corrosion ratio in Sample 1–4 containing almost equal quantity of the carbon aggregate. On the other hand, the corrosion ratio of the interface between melted pig iron and slug was 11.6%, far smaller than those of Samples 1–2 to 1–5. It indicates outstanding slug resistance.

Thermal conductivity was also measured. In Samples 1–3 to 1–5, thermal conductivity decreased due to the increase of alumina content. In Sample 1—1, in which the alumina content is only 11 parts and TiC is blended therein to replace the necessitated increase of alumina, decrease of thermal conductivity was hardly observed.

Embodiment 2. Content of Titanium Carbide

Following the compositions shown in Table 2 and by the same procedures as in Embodiment 1, carbonaceous refractory materials of Samples 2–1 to 2–7 were prepared, while the blend ratio of Tic was varied within a range of 0 to 11 parts. The applied titanium carbide showed the X-ray diffraction peak intensity ratio as indicated in FIG. 2. The particle diameter of alumina was 2 to 3 μm, while the particle diameter of metallic silicon was below 74 μm. Herein, the TiC particle diameter is 7 μm, while the mold size for forming the carbonaceous refractory materials is of 100 Φ×130 mm and the sample size is 20Φ×70 mm.

The upper parts of these Samples 2–1 to 2–7 were protected with alumina sleeve, so that only the lower parts of the samples to be corroded. The volume reduction ratio of the lower parts between prior to and after the test was defined as melted pig iron corrosion ratio. Herein, the volume was measured by Hydrostatic Method. As the melted pig iron source, cast iron (JIS FC-15; C content= 3.5%; Si content=2.9%) was used at 1.2 kg per each test. The samples, sample 2–1 to 2–7, were immersed in the melted cast iron and rotated for one hour under purging Ar gas into the melted cast iron by 40 ml/min.

The results are shown in Table 2.

TABLE 2

|  |  |  | Sample 2-1 | Sample 2-2 | Sample 2-3 | Sample 2-4 | Sample 2-5 | Sample 2-6 | Sample 2-7 |
|---|---|---|---|---|---|---|---|---|---|
| Raw material | artificial graphite |  | 76.5 | 72.5 | 70.5 | 68.5 | 67.5 | 66.5 | 65.5 |
|  | $Al_2O_3$ |  | 12 | 12 | 12 | 12 | 12 | 12 | 12 |
|  | Si |  | 11.5 | 11.5 | 11.5 | 11.5 | 11.5 | 11.5 | 11.5 |
|  | TiC |  | 0 | 4 | 6 | 8 | 9 | 10 | 11 |
|  | (subtotal of raw materials) |  | (100) | (100) | (100) | (100) | (100) | (100) | (100) |
|  | organic binder |  | 16 | 16 | 16 | 16 | 16 | 16 | 16 |
| Baked product | C |  | 78.9 | 75.3 | 735. | 71.7 | 70.8 | 69.9 | 69.0 |
|  | $Al_2O_3$ |  | 10.8 | 10.8 | 10.8 | 10.8 | 10.8 | 10.8 | 10.8 |
|  | Si |  | 10.3 | 10.3 | 10.3 | 10.3 | 10.3 | 10.3 | 10.3 |
|  | TiC |  | 0 | 3.6 | 5.4 | 7.2 | 8.1 | 9.0 | 9.9 |
| Corrosion ratio (%) | Ti content (%) in melted pig iron | 0.05 | 47.1 | 28.9 | 16.9 | 14.5 | 5.8 | 1.8 | 2.2 |
|  |  | 0.16 | 42.5 | 22.6 | 9.0 | 0.4 | 0.0 | 0.4 | 1.3 |
|  |  | 0.46 | 40.2 | 9.8 | 2.7 | Trace (wet) | Trace (wet) | Trace (wet) | Trace (wet) |

As shown in Table 2, it is clearly indicated that high corrosion resistance can be obtained in case of sample 2–5 to 2–7, in which the TiC content are above 9%, even in molten iron with a low Ti content. When the Ti concentration in molten iron becomes higher such as 0.46%, the samples apparently wetted with molten iron. It is not indicated in Table 2, however, the same wettability were obtained even at a TiC blend ratio of 5% with TiC of particle size of 2 μm.

As described above, it was shown that the carbonaceous refractory material for blast furnace in accordance with the invention possessed distinctive wettability with molten iron containing titanium.

Embodiment 3. Types of Titanium Compounds

By the same procedures as in Embodiment 1 and at the same blend ratio of Sample 2–7 shown in Table 2, carbonaceous refractory materials were produced, except the kinds of mixed Ti compounds, such as metal titanium, TiC, $TiC_{0.7}N_{0.3}$, $TiC_{0.3}N_{0.7}$ and TiN. The X-ray diffraction peak intensity ratio of the face (200) of the $Ti_3O_5$ to the face (111) of the titanium carbide is shown in Table 3. All the particle diameters of metallic titanium and the Ti compounds were 7 μm. The particle diameter of alumina was 2 to 3 μm, while the particle diameter of metallic silicon was 74 μm or less. Herein, the mold size for forming the carbonaceous refractory materials was of 100Φ×130 mm, while the sample size was 20Φ×70 mm.

With the same method as used above in the section [Embodiment 2. Content of titanium carbide], the corrosion ratio by melted pig iron was measured. The results are shown in Table 3.

side wall and furnace bottom of blast furnace hearth, the consumption of the inner lining material due to the dissolution into melted pig iron can be decreased, and simultaneously, the protective layer with a high melting point can be fixed on the bottom. Thus, abrasion due to the flow of melted pig iron can be decreased, which works to prolong the life of the blast furnace.

What is claimed is:

1. A baked carbonaceous refractory material, produced by baking in a non-oxidizing atmosphere, containing 50 to 85% by mass of carbon, 5 to 15% by mass of a refractory metal oxide alumina, 5 to 15% by mass of metallic silicon, and 5 to 20% by mass in total of at least one selected from the group consisting of metallic titanium, titanium carbide, titanium nitride and titanium carbonitride $TiC_xN_y$, where $0<x, y<1$ and $x+y=1$, where the X-ray diffraction peak intensity ratio of the face (200) of the $Ti_3O_5$ to the face (111) of titanium carbide is 1% or less.

2. A method for producing a baked carbonaceous refractory material by compounding 50 to 85% by mass of carbonaceous materials, as main raw materials, which are calcined anthracite, calcined coke, natural graphite, artificial graphite or these mixture, with 5 to 15% by mass of a refractory metal oxide alumina, 5 to 15% by mass of metallic silicon and 5 to 20% by mass in total of at least one selected from the group consisting of metallic titanium,

TABLE 3

| | | | | | TiC con-ventional | $TiC_{0.7}N_{0.3}$ | $TiC_{0.3}N_{0.7}$ | TiN | 2 types A | 2 types B | 2 types C | 3 types | 4 types |
|---|---|---|---|---|---|---|---|---|---|---|---|---|---|
| | | | Ti | TiC | | | | | | | | | |
| Raw material | artificial graphite | | 65.5 | 65.5 | 65.5 | 65.5 | 65.5 | 65.5 | 65.5 | 65.5 | 65.5 | 65.5 | 65.5 |
| | $Al_2O_3$ | | 12 | 12 | 12 | 12 | 12 | 12 | 12 | 12 | 12 | 12 | 12 |
| | Si | | 11.5 | 11.5 | 11.5 | 11.5 | 11.5 | 11.5 | 11.5 | 11.5 | 11.5 | 11.5 | 11.5 |
| | X-ray diffraction peak intensity ratio | | — | 0.0% (FIG. 2) | 2.7% (FIG. 1) | — | — | — | — | — | — | — | — |
| | (subtotal of raw materials) | | (100) | (100) | (100) | (100) | (100) | (100) | (100) | (100) | (100) | (100) | (100) |
| | organic binder | | 19 | 16 | 16 | 16 | 16 | 16 | 16 | 16 | 16 | 16 | 17 |
| Baked product | C | | 68.4 | 69.0 | 69.0 | 69.0 | 69.0 | 69.0 | 69.0 | 69.0 | 69.0 | 69.0 | 68.7 |
| | $Al_2O_3$ | | 10.5 | 10.8 | 10.8 | 10.8 | 10.8 | 10.8 | 10.8 | 10.8 | 10.8 | 10.8 | 10.7 |
| | Si | | 10.1 | 10.3 | 10.3 | 10.3 | 10.3 | 10.3 | 10.3 | 10.3 | 10.3 | 10.3 | 10.2 |
| | Ti compounds | | 11.0 | 9.9 | 9.9 | 9.9 | 9.9 | 9.9 | 9.9 | 9.9 | 9.9 | 9.9 | 10.4 |
| Corrosion ratio (%) | Ti content in melted pig iron (%) | 0.16 | 2.3 | 1.3 | 15.6 | 1.5 | 3.1 | 2.2 | 1.7 | 1.5 | 2.5 | 1.8 | 1.9 |
| | | 0.46 | trace (wet) | trace (wet) | 4.4 | trace (wet) | trace (wet) | trace (wet) | trace (wet) | trace (wet) | trace (wet) | trace (wet) | trace (wet) |

2 types A: mixture of $TiC/TiC_{0.7}N_{0.3}$ = 1/1
2 types B: mixture of $TiC/TiC_{0.7}N_{0.3}$ = 1/1
2 types C: mixture of $TiN/TiC_{0.7}N_{0.3}$ = 1/1
3 types mixture of $TiC/TiC_{0.7}N_{0.3}/TiN$ = 1/1/1
4 types A: mixture of $Ti/TiC/TiC_{0.7}N_{0.3}/TiN$ = 1/1/1/1

As clearly shown in Table 3, it is indicated that high corrosion resistance was obtained in all the case of using metallic titanium, TiC, $TiC_{0.7}N_{0.3}$, $TiC_{0.3}N_{0.7}$, TiN and two or three or more of metallic titanium and the Ti compounds as metallic titanium and Ti compounds. When the Ti concentration in melted pig iron was as high as 0.46%, wettability with pig iron was obviously recognized in any case.

In case of using any of metallic titanium, TiC, $TiC_{0.7}N_{0.3}$, $TiC_{0.3}N_{0.7}$, and TiN as metallic titanium and Ti compounds, as described above, distinctive wettability with melted pig iron containing titanium was confirmed.

INDUSTRIAL APPLICABILITY

As described above, by using the carbonaceous refractory material of the invention as the inner lining material of the titanium carbide, titanium nitride, and titanium carbonitride $TiC_xN_y$, where $0<x, y<1$ and $x+y=1$, and by adding organic binder to the mixture, then kneading, forming and baking in non-oxidation atmosphere to obtain the carbonaceous refractory materials in the first claim, where the X-ray diffraction peak intensity ratio of the face (200) of the $Ti_3O_5$ to the face (111) of titanium carbide is 1% or less.

3. The baked carbonaceous refractory material of claim 1, where the refractory metal oxide contains at least one selected from the group consisting of zircon, magnesia, mullite, spinel and silica.

4. The method of producing the baked carbonaceous refractory material of claim 2, where the refractory metal oxide contains at least one selected from the group consisting of zircon, magnesia, mullite, spinel and silica.

5. The baked carbonaceous refractory material of claim 1,
wherein the 5 to 20% by mass in total of at least one selected from the group consisting of metallic titanium, titanium carbide, titanium nitride and titanium carbonitride $TiC_xN_y$, where $0<x, y<1$ and $x+y=1$, a sufficient amount of the titanium dissolves and enables the formation of a high melting point protective layer bound to the carbonaceous refractory material.

6. The method of producing the baked carbonaceous refractory material of claim 2,
wherein the 5 to 20% by mass in total of at least one selected from the group consisting of metallic titanium, titanium carbide, titanium nitride and titanium carbonitride $TiC_xN_y$, where $0<x, y<1$ and $x+y=1$, a sufficient amount of the titanium dissolves and enables the formation of a high melting point protective layer on the carbonaceous refractory material surface.

7. A durable carbonaceous refractory material, produced by baking in a non-oxidizing atmosphere, for lining the side walls and bottom region of a blast furnace hearth, the durable carbonaceous refractory material having a reduced carbonization dissolution rate and an increased wettability with molten iron to yield excellent corrosion resistance properties, consisting essentially of:

50 to 85% by mass of carbon;

5 to 15% by mass of a refractory metal oxide selected from the group consisting of alumina, zircon, magnesia, mullite, spinel and silica, the refractory metal oxide being present in a sufficient amount to form a residual refractory metal oxide layer on the surface of the carbonaceous refractory materials even after dissolution of the carbon aggregates and to stay between the carbonaceous refractory material and molten iron to prevent the contact between the carbonaceous refractory material and the molten iron, thereby reducing the consumption of the carbonaceous refractory materials;

5 to 15% by mass of metallic silicon; and 5 to 20% by mass in total of at least one metallic titanium or titanium compound selected from the group consisting of metallic titanium Ti, titanium carbide TiC, titanium nitride TiN, titanium carbonitride $TiC_{0.7}N_{0.3}$, and titanium carbonitride $TiC_{0.3}N_{0.7}$, the metallic titanium or titanium compound being present in an amount to sufficiently cover the whole surface of the carbonaceous refractory material which is not sufficiently supplied by the residual refractory metal oxide layer after the dissolution of the carbon aggregate, such that a durable and economical covering layer is formed on the carbonaceous refractory material surface, the metallic titanium or titanium compound allowing improved wettability with molten iron, wherein the X-ray diffraction peak intensity ratio of the face (200) of the $Ti_3O_5$ to the face (111) of titanium carbide is 1% or less.

8. The durable carbonaceous refractory material of claim 7,
wherein the particle size of the refractory metal oxide alumina being sized in the range of 2 µm to 3 µm.

9. The durable carbonaceous refractory material of claim 7,
wherein the particle size of the metallic silicon being sized in the range of 1 µm to 74 µm.

10. The durable carbonaceous refractory material of claim 7,
wherein the particle size of the metallic titanium and titanium compounds is 7 µm.

11. A durable carbonaceous refractory material, produced by baking in a non-oxidizing atmosphere, for lining the side walls and bottom region of a blast furnace hearth, the durable carbonaceous refractory material having a reduced carburization dissolution rate and an increased wettability with molten iron to yield excellent corrosion resistance properties, consisting essentially of:

50 to 85% by mass of carbon;

5 to 15% by mass of a refractory metal oxide selected from the group consisting of alumina, zircon, magnesia, mullite, spinel and silica, the refractory metal oxide being present in a sufficient amount to form a residual refractory metal oxide layer on the surface of the carbonaceous refractory materials even after dissolution of the carbon aggregates and to stay between the carbonaceous refractory material and molten iron to prevent the contact between the carbonaceous refractory material and the molten iron, thereby reducing the consumption of the carbonaceous refractory materials;

5 to 15% by mass of metallic silicon; and 5 to 20% by mass in total of at least one metallic titanium or titanium compound selected from the group consisting of metallic titanium Ti, titanium carbide TiC, titanium nitride TiN, titanium carbonitride $TiC_{0.7}N_{0.3}$, and titanium carbonitride $TiC_{0.3}N_{0.7}$, the metallic titanium or titanium compound being present in an amount to sufficiently cover the whole surface of the carbonaceous refractory material which is not sufficiently supplied by the residual refractory metal oxide layer after the dissolution of the carbon aggregate, such that a durable and economical covering layer is formed, the metallic titanium or titanium compound allowing improved wettability with molten iron, wherein the X-ray diffraction peak intensity ratio of the face (200) of the $Ti_3O_5$ to the face (111) of titanium carbide is 1% or less.

12. A method for producing a baked carbonaceous refractory material by compounding 50 to 85% by mass of carbonaceous materials, as main raw materials, which are calcined anthracite, calcined coke, natural graphite, artificial graphite or these mixture, with 5 to 15% by mass of a refractory metal oxide alumina, 5 to 15% by mass of metallic silicon and 5 to 20% by mass in total of at least one selected from the group consisting of metallic titanium, titanium carbide, titanium nitride, and titanium carbonitride $TiC_xN_y$, where $0<x, y<1$ and $x+y=1$, and by adding organic binder to the mixture, then kneading, forming and baking in non-oxidation atmosphere to obtain the carbonaceous refractory materials in claim 1, where the X-ray diffraction peak intensity ratio of the face (200) of the $Ti_3O_5$ to the face (111) of titanium carbide is 1% or less.

* * * * *